May 8, 1962   G. H. FARNSWORTH ET AL   3,033,952
BUS DUCT PLUG-IN WITH AUXILIARY HANDLE
Original Filed Dec. 28, 1956   3 Sheets-Sheet 1
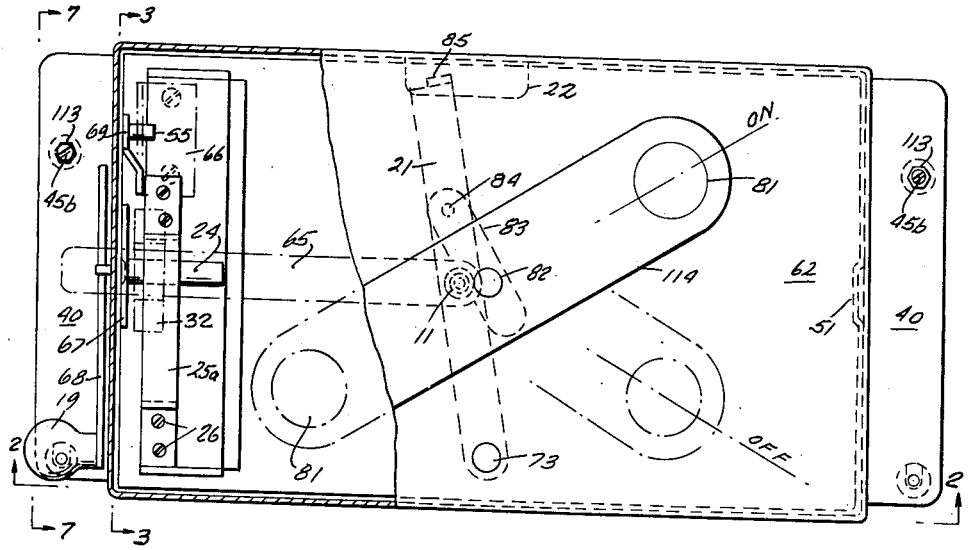
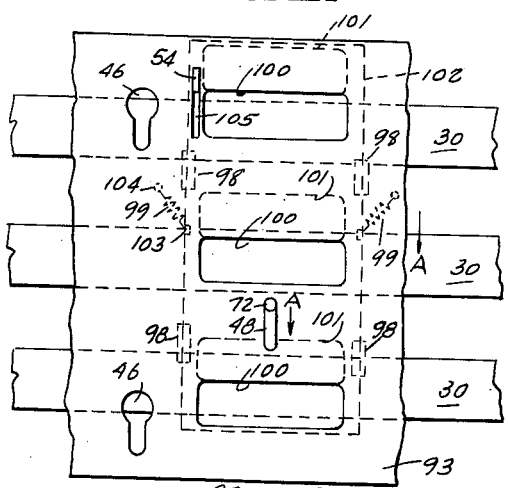
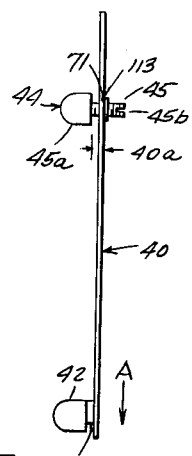
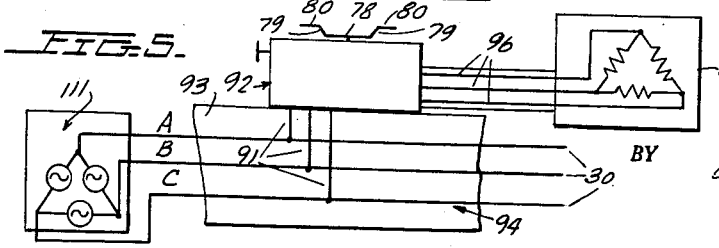
INVENTOR
JOHN A. HERRMANN
GEORGE A. FARNSWORTH
BY
ATTORNEY May 8, 1962 G. H. FARNSWORTH ET AL 3,033,952
BUS DUCT PLUG--IN WITH AUXILIARY HANDLE
Original Filed Dec. 28, 1956 3 Sheets-Sheet 2
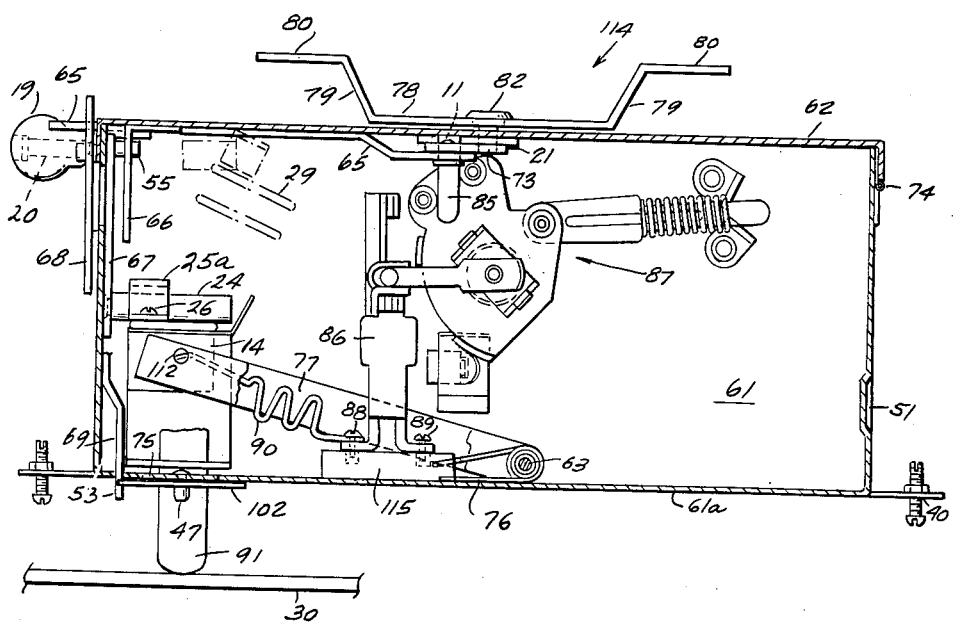
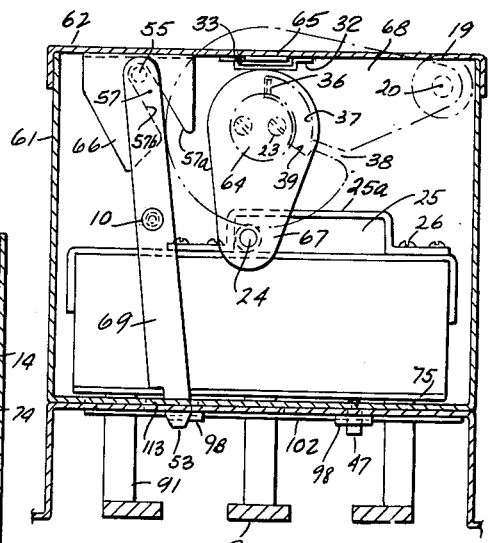
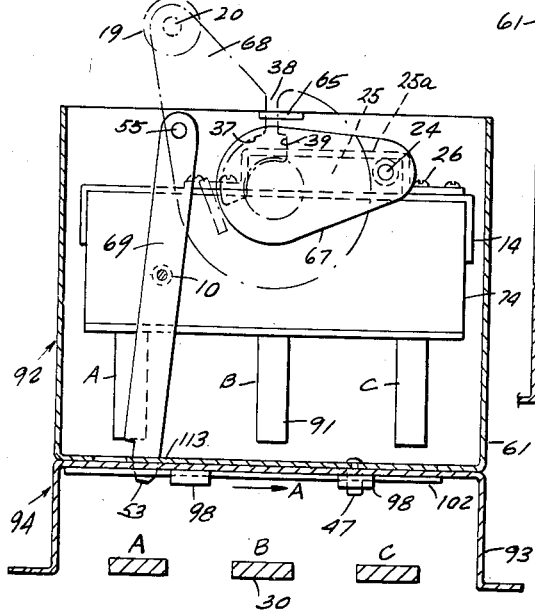
INVENTOR
JOHN A. HERRMANN
GEORGE A. FARNSWORTH
BY
ATTORNEY May 8, 1962 G. H. FARNSWORTH ET AL 3,033,952
BUS DUCT PLUG-IN WITH AUXILIARY HANDLE
Original Filed Dec. 28, 1956 3 Sheets-Sheet 3

INVENTOR
JOHN A. HERRMANN
GEORGE A. FARNSWORTH
BY
Ostrolenk, Faber,
Gerb & Soffen
ATTORNEY 3,033,952
BUS DUCT PLUG-IN WITH AUXILIARY HANDLE
George H. Farnsworth, Detroit, and John A. Herrmann, Grosse Pointe Farms, Mich., assignors to I-T-E Circuit Breaker Company, Philadelphia, Pa., a corporation of Pennsylvania
Original application Dec. 28, 1956, Ser. No. 631,154. Divided and this application June 27, 1958, Ser. No. 745,083
7 Claims. (Cl. 200—50)

This application is a division of application Serial No. 631,154 filed December 28, 1956 and assigned to the assignee of the instant invention.

Our invention relates to bus duct plugs associated with plug-in bus ducts and more particularly to duct plugs having retractable positive acting disconnect fingers and features for automatic control of the bus duct shutter.

Present bus duct plugs expose the operator to dangers of electrical shock both during installation on and removal from the bus duct housing. During installation it is necessary for the operator to first open the duct shutter, thus exposing the bus bars. Then the protruding contact fingers of the plug must be positioned into the opening in the duct housing to contact the bus bars. After this hazardous locating process, the operator must hold the plug with one hand, and now has but one hand free to perform the fastening operation.

Further danger exists since the plug is always energized when the bus duct system is energized. Should the plug cover be opened, live circuitry is exposed to the operator. Arcing at the bus will take place if the plug is connected or disconnected when the cooperating contacts of the disconnect switch are engaged. After the plug is disconnected from the duct housing the operator must then close the duct shutter.

Our invention solves the foregoing problems by permitting the plug to be positioned on the duct housing before the shutter is opened. The locating means also holds the plug loosely to the duct so that the operator now has both hands free to secure the connection. In one embodiment of our invention the mere final positioning of the plug on the duct housing automatically opens the duct shutter and in a second embodiment the shutter opens automatically when the plug cover is closed and closes automatically when the plug cover is opened.

An auxiliary handle provides the positive control of the conducting fingers which are kept in high pressure contact with the bus during load switching operation, the load switching being accomplished by a control handle.

A system of interlocks prevents load switching while the disconnect fingers are not in engagement with the bus bars and prevents the disconnect fingers from disengaging the bus while the load switch is On.

Accordingly, the primary object of our invention is to provide a bus duct plug with means to automatically control the opening and closing of the shutter over the plug-in openings in the duct housing.

Another object is to provide simple means for attaching the plug to the duct housing.

Still another object is to provide positive acting disconnect fingers making high pressure contact with the bus and remaining in high perssure contact during load switching.

A further object is to provide means which prevent the plug cover from being opened while the plug is electrically connected to the bus.

A still further object is to provide means which prevent load switching unless the disconnect fingers are in high pressure contact with the bus bars.

Still another object is to provide means which prevent the disconnect fingers from disengaging the bus bars while the load switch cooperating contacts are engaged.

Still another object is to prevent positioning of the contact fingers while the disconnect or load switch is On.

These and other objects of our invention will become apparent after reading the following description considered with the drawings in which:

FIGURE 1 is a plan view of the plug with a portion of the cover and the parts connected thereto drawn in phantom.

FIGURE 2 is a section taken along line 2—2 of FIGURE 1 looking in the direction of arrows 2—2 with the disconnect fingers engaging the bus bars and the disconnect switch On.

Figure 8:
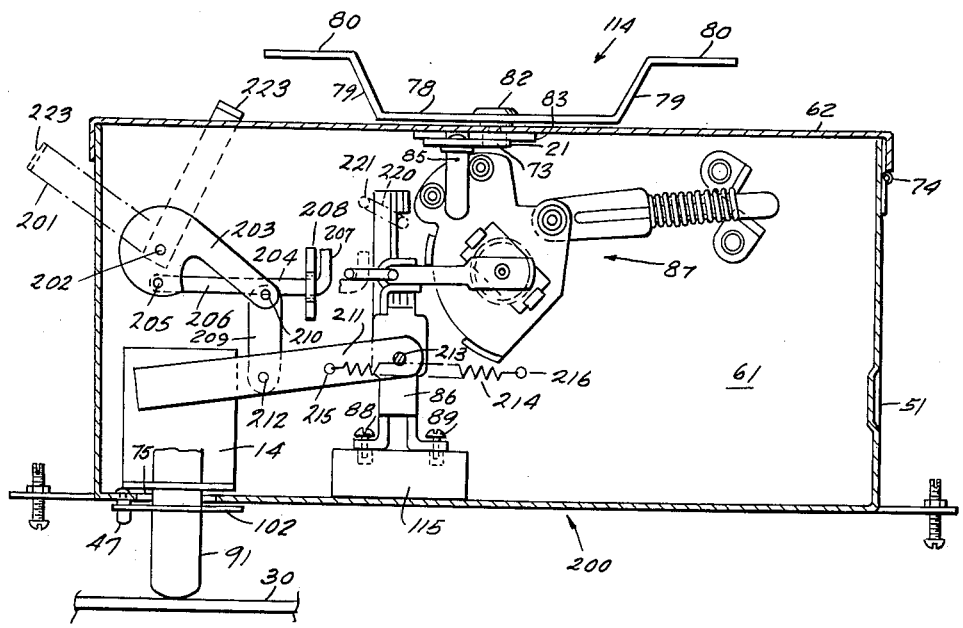

FIGURES 3 and 4 are sections taken along line 3—3 of FIGURE 1 looking in the direction of arrows 3—3.

In FIGURE 3 the disconnect fingers are retracted into the plug case and the plug cover is opened.

In FIGURE 4 the disconnect fingers are projected from the plug case.

FIGURE 5 is a diagrammatic presentation of a completed system from a load through a plug and plug-in duct to a generator.

FIGURE 6 is a section of the plug-in duct to which the plug will be affixed with the shutter in its closed position.

FIGURE 7 is an end view of one mounting flange looking in the direction of arrows 7—7 of FIGURE 1.

FIGURE 8 is a side view similar to FIGURE 2 showing another embodiment of our invention.

The drawings illustrate a three phase system. However, this invention is adaptable equally well to a single phase system or a system having any number of phases by merely providing, for each phase, a conducting finger, a pair of cooperating contacts and a terminal for the output connection, the components of each phase being simultaneously operated.

Referring to FIGURE 5, a bus duct plug 92 is shown installed on the housing 93 of a plug-in bus duct 94 with the contact fingers 91 of the plug 92 engaging the bus conductors 30. The bus conductors 30 are in turn connected to the source of electrical energy 111. One end of conductors 96 is connected to the load 97.

The function of the bus duct plug 92 is to complete the electrical path between the other ends of conductors 96 and the bus bars 30. This is accomplished by passing the conductors 96 through the knockout 51 (FIGURE 2) in the end of the plug case 61. The conductors 96 are connected (not shown) to load terminals 89 of the load or disconnect switch 86, which may be a disconnect contact head of the type disclosed in Patent No. 2,302,849 to W. H. Frank et al. entitled "Switch," issued November 24, 1942 and now assigned to the same assignee as the instant application. To the line terminals 88 of the load switch 86 are connected one end of pigtails 90 whose other ends are connected to the contact fingers 91 at terminals 112. The contact fingers 91 are projected through the opening 75 in the bottom surface 61a of the case 61 and through openings 100 (FIGURE 6) in the duct housing in alignment with plug openings 75 so that fingers 91 contact the bus conductors 30. The electrical path is completed when the load switch 86 is On which electrically connects load terminals 89 to line terminals 88.

As a setting for the operation of our plug 92, it will be described as being affixed to a plug-in duct 94 having in its housing 93 button hook shaped slots 46 (FIGURE 6) and openings 100 aligned opposite the bus conductors 30. A shutter 102 rides in guide channels 98, which are affixed to the inside surface of the duct housing 93, and serves to cover the duct openings 100 when the plug 92 is not connected to the duct housing. For automatic control of the shutter 102, the operation of which will be hereinafter explained, slots 105 and 48 are cut in the duct housing 93 and hole 72 and notch 54 are cut in the shutter 102. Openings 101 in shutter 102 align with the openings 100 in the duct housing 93 when the shutter 102 is opened. Tension springs 99 anchored to the duct housing 93 at pins 104 and to the shutter 102 at pins 103 bias the shutter 102 to its closed position.

*Mounting of Plug-In Unit 92 on Bus Duct Housing 93*

In order to mount the plug 92 to the duct housing 93, mounting flanges 40 (FIGURES 1 and 7) extend from the ends of the plug case 61 in a plane with the bottom of the case 61. Lugs 42 with undercut notches 43 are rigidly affixed to the mounting flanges 40. Holes 71 are tapped in the flanges 40 to receive the left-hand threaded portions 45 of lugs 44 having large heads 45a.

The large heads of lugs 42 and 44 are passed through the large portions of button hook slots 46 in the duct housing 93 at a time when the large heads 45a of lugs 44 are spaced a short distance 40a from the mounting flanges 40. The distance 40a to be slightly greater than the thickness of the material of which the duct housing 93 is constructed. Then the plug 92 is moved in the direction indicated by arrow A so that the large heads of lugs 42 and 44 are captured by the narrow sections of button hook slots 46. This will hold the plug 92 loosely to the duct housing 93 so that the operator has both hands free to complete the fastening operation.

The slot 45a in the end of the narrow body 45 of lug 44 is now accessible and a screw driver may be inserted therein and the lugs 44 rotated clockwise until the plug 92 is drawn snugly to duct housing 93. Locknuts 113 are then tightened to secure the connection. This type of mounting is not only mechanically secure but also furnishes a good electrical ground connection.

*Shutter Control*

The drawings show both a shutter control pin 47 projecting from the bottom of the case 61 and a shutter control lever 69 pivotally mounted to the end of the case 61. However, in practice a plug 92 will have either the pin 47 or lever 69, but never both of them.

Considering the embodiment having the shutter control pin 47, the mere final positioning of the plug 92 on the duct housing 93 will open the shutter 102 and the mere removal of the plug 92 from the duct housing 93 will close the shutter. The operation is as follows: when the plug 92 is not mounted to the duct housing 93, the shutter 102 (FIGURE 6) is biased to a closed position by springs 99 which means that duct openings 100 are covered by the shutter 102. Lugs 42 and 44 are introduced to the wide sections of button hook slots 46 and at this time pin 47 is received by hole 72 in the shutter 102. When the plug 92 is moved in the direction of arrow A, the pin 47 moves downward in slot 48 and pin 47 carries with it the shutter 102. When the plug 92 has reached the end of its travel in direction indicated by arrow A, the holes 101 in the shutter 102 are in register with the openings 100 in the duct housing 93. As the plug 92 is removed from the duct housing 93, the pin 47 must move in a direction opposite to arrow A and in so doing closes the shutter 102. When the pin 47 is removed from hole 72 in the shutter 102, the shutter 102 remains closed due to the biasing action of springs 99.

A second embodiment dispenses with shutter operating pin 47 and utilizes shutter operating lever 69 (FIGURES 3 and 4) and cam slot 57 to control the shutter 102 as the plug cover 62 is opened and closed. Shutter operating lever 69 is pivotally mounted to the inside end of the case 61 by rivet 10. The lower end 53 of lever 69 projects through an opening 113 in the bottom of the plug case 61. The other end of lever 69 has an inwardly projecting pin 55 attached thereto. Pin 55 rides in cam slot 57 of actuator cam 66 that projects from the inside of the case cover 62.

If the plug 92 is to be connected to the duct housing 93 at a time when the plug cover 62 is closed, the tip 53 of lever 69 is received by shutter notch 54 and the initial opening of the shutter 102 takes place in the same manner as the opening previously described with pin 47, as tip 53 rides in slot 105 when the plug 92 is moved to its final position. However, shutter operation is controlled by the plug cover 62 once the plug 92 is mounted to the duct housing 93.

FIGURE 3 illustrates the lever 69 in the closed shutter position with the lever tip 53 held to the left by biasing springs 99, the cover 62 having been pivoted open about hinges 74 (FIGURE 2). As the cover 62 is closed the pin 55 is engaged by edge 57a of cam slot 57 which moves pin 55 from right to left and the tip 53 from left to right to the position shown in FIGURE 4. The reverse movement of lever 69 takes place as the cover 62 is opened. Edge 57b of cam slot 57 is only operative when there are no springs 99 to bias the shutter 122 closed.

*Positioning the Contact Fingers*

Referring to FIGURES 3 and 4, the position of the contact fingers 91 is controlled by auxiliary handle 68 which is operatively connected to contact holder 14 in which the fingers 91 are mounted.

The auxiliary handle 68 is pivotally mounted to the end of the case 61 by means of spacer bearing 64. Handle 19 is pivotally mounted by pin 20 to auxiliary handle 68. An auxiliary actuator 57, located inside the case 61 is also mounted to bearing 64 by means of screws 23 which also serve to mount the auxiliary handle 68 to the spacer bearing 64 so that auxiliary actuator 67 moves in unison with auxiliary handle 68.

Beginning with the auxiliary handle 68, as shown in FIGURE 3, with the fingers 91 retracted into the case 61, the handle 68 is rotated clockwise. In so doing the post 24, projecting from auxiliary actuator 67 and riding in raceway 25 formed by bracket 25a being affixed to contact holder 14 by means of screws 26, moves in a downward direction causing the contact holder 14 to move downward lowering the contact fingers 91 through opening 75 in the bottom of case 61 (FIGURE 4) to engage the bus bars 30 in high pressure contact. This engagement is shown to be by butt contact, but those skilled in the art will recognize that frictional contact may be made with bus bars mounted edgewise.

Referring to FIG. 2, contact holder 14 is pivotally mounted to the case 61 at posts 63 by means of arms 77. Arms 77 are rigidly affixed to contact holder 14 and pivotally mounted to the case 61. Springs 76 bear against arms 77 and the bottom of the case 61 to bias the contact holder 14 upward. When auxiliary handle 68 is placed in the On position the biasing springs 76 urge contact holder 14 upward which in turn urges pin 24 clockwise about spacer bearing 64 latching the auxiliary handle 68 in the On position. The clockwise rotation of auxiliary handle 68 is limited by the cover catch 36, projecting from the end of the cover 62, which rides in slot 37 of auxiliary handle 68.

*Load Switching and Interlocks*

In order to open the cover 62 the auxiliary handle 68 must be positioned so that the slot 38 in the auxiliary handle 68 will provide a passage for the cover catch 36 to leave arcuate slot 37. When catch 36 rests in extension 39 of slot 37 the cover cannot accidentally fly open. Nor can the cover 62 be opened when the conducting fingers 91 are engaging the bus bars 30 since at this time the auxiliary handle 68 is in its most clockwise position (FIGURE 4) with the cover catch 36 being positioned in arcuate slot 37 so that in attempting to open the cover 62 the catch 36 will strike the auxiliary handle 68.

As clearly seen in FIGURES 3 and 4, the entrance to slot 38 (end opposite arcuate slot 37) is wide mouthed. The right or rounded surface defining this entrance constitutes a cam which is engaged by catch 36 upon closing of cover 62. This engagement causes slight clockwise rotation of auxiliary handle 68 from its position of FIGURE 3 so that slot 38 is aligned with catch 36. Thus, it is seen that merely it is not necessary to manipulate handle 68 in order to fully close cover 62.

Control handle 114 consists of a lower section 78 and two raised sections 80. Inclined sections 79 join sections 80 to section 78. Holes 81 are in sections 80 and permit load switching from a distant point by means of an extension. Referring to FIGURE 1, handle 114 is pivotally mounted to the outer side of the case cover 62 by means of rivet 82 or other suitable means. Link 83 is pivotally mounted to the inside of the cover 62 by means of rivet 82 and moves in unison with handle 114. Link 83 is pivotally connected to member 21 by rivet 84.

One end of member 21 pivots on post 73 which projects inwardly from the cover 62. Projecting from the other end of member 21 is a finger 85 which engages the load switching mechanism 87. Rotating finger 85 from right to left in FIGURE 2 causing the operating mechanism 87 to bring the cooperating contacts into engagement. The cooperating contacts are part of the load switch 86 which is mounted on insulating block 115 which is affixed to the bottom of the case 61. Closing the cooperating contacts electrically connects the load terminal 89 to the line terminal 88 of load switch 86. Movement of the switching handle 114 does not effect the high pressure contact of the fingers 91 with the bus 30 since during the movement of switching handle 114 the auxiliary handle 68 does not move from its extreme clockwise position or the position in which the conducting fingers 91 are in high pressure engagement with the bus bars 30.

Near its midpoint, member 21 is pivotally connected to cover link 65. As control handle 114 is rotated from Off to On, cover link 65 moves from right to left in FIGURE 1 guided by the cover clip 32 mounted on the inside of the cover 62, and extends through slot 33 in the auxiliary handle 68 but only when the auxiliary handle 68 is positioned fully clockwise to engage the fingers 91 with the bus bar 30. At all other times the link 65 will strike the auxiliary handle 68. It follows that load switching is prevented unless the auxiliary handle 68 has been positioned to project the conducting fingers 91 out of the case 61 into high pressure engagement with the bus bars 30 since this is the only position of auxiliary handle 68 that will position slot 33 to receive the cover link 65.

Link 65 being positioned in slot 33 of auxiliary actuator 68 when the disconnect switch 86 is On, prevents the cover 62 from being opened while the control handle 114 is in its On position. This also prevents the auxiliary handle 68 from being rotated to its Off position until the control handle 114 is first rotated to its Off position. Therefore, the contact fingers 91 cannot be retracted while the load switch 86 is On for at this time the link 65 is positioned in slot 33 and prevents rotation of the auxiliary handle 68 which controls the positioning of the conducting fingers 91.

Thus, there are three interlocks. The first interlock prevents closing of the disconnect switch 86 unless the conducting fingers 91 engage the bus bars 30. This is accomplished by operatively connecting the link 65 to the control handle 114 which controls the operation of the disconnect switch 86. Movement of the link 65 and control handle 114 is blocked by the auxiliary handle 68 at all times except when the auxiliary handle 68 has positioned the conducting fingers 91 to engage the bus bars 30 and at this time a slot 33 cut in the auxiliary handle 68 is aligned to receive the link 65 and permit the operating handle 114 to be rotated.

The second interlock prevents the conducting fingers 91 from disengaging the bus bars 30 while the disconnect switch 86 is On. This second interlock is formed by the link 65 being positioned inside the slot 33 of the auxiliary handle 68 when the load switch 86 is On. Thus the link 65 prevents movement of the auxiliary handle 68 while the disconnect switch 86 is On.

The third interlock prevents the cover 62 from being opened when the conducting fingers 91 are connected to the bus bars 30. This interlock is formed by a projection 36 on the cover 62 which is positioned in an arcuate slot 37 cut in the auxiliary handle 68, with the cover 62 being prevented from opening unless the fingers 91 are retracted into the plug case 61, by having the movement of the cover projection 36 restricted by the body of the auxiliary handle 68 when the auxiliary handle 68 has positioned the connecting fingers 91 to engage the bus bars 30.

Another embodiment of our invention, illustrated in FIGURE 8, shall now be described. Where the parts of FIGURE 8 are the same as those illustrated in FIGURES 1–7, the same reference numerals have been retained.

The operating mechanism of bus duct plug 200 is enclosed in a case 61 having a cover 62 pivotally mounted thereto at 74. A control handle 114 is pivotally mounted to the top of the cover at pin 82 to control the switch operating mechanism 87 which in turn operates the disconnect or load switch 86 as in the previously described embodiment.

The auxiliary handle 201 is pivotally mounted to each side of the case 61 at fixed pivots 202 with cross member 223 straddling the top of the case 61 and cover 62 when the contact fingers 91 project out of the case 61 or straddles the end of the case 61 when the fingers 91 are within the confines of the case 61. One of the pins 202 is rigidly mounted to the auxiliary handle 201 and to an auxiliary actuator 203 so that the auxiliary handle 201 and the auxiliary actuator 203 move in unison.

The leg 206 of L-shaped member 204 is pivotally connected at pin 205 to auxiliary actuator 203 with the leg 206 being free to slide horizontally in guide member 208 as the auxiliary actuator 203 is rotated. Guide member 208 is secured to the side of case 61. A connecting link 209 is pivotally mounted to auxiliary actuator 203 at pin 210 and to arm 211 at pin 212.

Arms 211 are rigidly affixed to each side of the contact holder 14 and pivotally connected to the sides of case 61 at fixed pivots 213. An overcenter device consisting of tension springs 214 connected to pins 216 on the case 61 and pins 215 on the arms 211 serves to bias the disconnect fingers 91 into their engaged position when the auxiliary handle 201 is rotated clockwise and to their disengaged position when the auxiliary handle 201 is rotated counterclockwise.

A bail 220 extends from the switch operating mechanism 87 and is operatively positioned to cooperate with the foot 207 of L-shaped member 204 as an interlock to prevent operation of the auxiliary handle 201 if the cooperating fingers of the load switch 86 are in engagement. The disconnect positions of the auxiliary handle 201 and foot 207, and the disengaged position of bail 220 are indicated by the broken lined representation of these elements.

If the load switch 86 is On when the fingers 91 are extended, an attempt to move the fingers 91 to their retracted position will be unsuccessful since the L-shaped member 204 will be prevented from moving to the right by bight 221 of bail 220 which is in the path of foot 204. If the load switch 86 is On while the fingers 91 are retracted, they may not be extended until the load switch 86 is first turned Off because the bight 221 is now hooked over foot 207 and prevents its movement to the left.

Since cross member 223 of auxiliary handle 201 straddles the cover 62 when the fingers 91 are extended, the cover 62 cannot be opened until the fingers 91 are first retracted by the counterclockwise movement of auxiliary handle 201.

While the button hook slots 46 on the duct housing 93 have been illustrated as being aligned at right angles to the bus bars 30 so that the bus duct plug 92 is secured with a lateral movement, the mounting operation can be achieved equally well by aligning the button hook 46 slots parallel to the bus bars 30 and moving the bus duct plug 92 longitudinally. In this case, the narrow sections of slots 46 would have to be elongated.

The longitudinal mounting would require a change in the shutter control which could readily be accomplished by repositioning the guide channels 98 and biasing springs 99 to be parallel to the bus bars and rotating and elongating slot 48 for the pin operated embodiment. Cover operation of the shutter may be achieved by mounting the lever 69 to the side of case 61 instead of the end, and providing a suitably shaped and positioned operating cam secured to the cover 62.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. A plug-in unit for a bus duct system comprising a case, a first means, a first control operatively connected to said first means, said case comprising a cover and an opening; said opening positioned to be in alignment with an opening in a duct housing when said case is fastened to the duct housing, said first means comprising a conducting finger, said first control having three positions, said first position of said first control preventing a cover of said case from being opened, said second position of said first control permitting a cover of said case to be opened, said conducting finger being within the confines of said case when said first control is in said first and second positions and being projected out of said opening to engage a bus bar within the duct housing in high pressure when said first control is in said third position; said second position of said first control being between said first and third position; said first control being operatively connected to said first means through a direct mechanical drive to thereby give positive control of said conducting finger; biasing means urging said first control toward said third portion when said finger is fully projected and urging said first control toward said first position when said finger is within the confines of the case, cooperating engageable means carried by said first control and said cover to prevent opening of said cover when said first control is in said first and said third positions and permitting opening of said cover when said first control is in said second position, said cooperating engageable means constructed so that during closing of said cover said first control is automatically moved to said second position against the force of said biasing means.

2. A plug-in unit for a bus duct system comprising a case, a first means, a second means, a first control operatively connected to said first means, a second control operatively connected to said second means; said case having a cover and an opening, said opening being positioned to be in alignment with a duct housing opening when said case is fastened to the duct housing, said first means comprising a conducting finger and a contact holder, said conducting finger being mounted in said contact holder, said first control having three positions, said first position of said first control preventing a cover of said case from being opened, said second position of said first control permitting a cover of said case to be opened, said conducting finger being within the confines of said case when said first control is in said first and second positions and being projected out of said case opening to engage a bus bar when said first control is in said third position, said second position of said first control being between said first and third position; said first control being operatively connected to said first means through a direct mechanical drive to thereby give positive control of said conducting finger, said second means comprising a pair of cooperating contacts and an operating mechanism, said operating mechanism being associated with said cooperating contacts to bring them into and out of engagement, said cooperating contacts being disengaged when said second control is in a first position and engaged when said second control is in a second position; biasing means urging said first control toward said third position when said finger is fully projected and urging said first control toward said first position when said finger is within the confines of the case, cooperating engageable means carried by said first control and said cover to prevent opening of said cover when said first control is in said first and said third positions and permitting opening of said cover when said first control is in said second position, said cooperating engageable means constructed so that during closing of said cover said first control is automatically moved to said second position against the force of said biasing means.

3. A plug-in unit for a bus duct system comprising a case, a first means, a second means, a first control operatively connected to said first means, a second control operatively connected to said second means, said case having a cover and an opening, said opening being positioned to be in alignment with a duct housing opening when said case is fastened to the duct housing, said first means comprising a conducting finger, said first control having three positions, said conducting finger being within the confines of said case when said first control is in said first and second positions and being projected out of said case opening into high pressure engagement with a bus bar when said first control is in said third position, said second position of said first control being between said first and third position; said first control being operatively connected to said first means through a direct mechanical drive to thereby give positive control of said conducting finger, said second means comprising a pair of cooperating contacts and an operating mechanism, said operating mechanism being associated with said cooperating contacts to bring them into and out of engagement, said cooperating contacts being disengaged when said second control is in a first position and engaged when said second control is in a second position, movement of said second control between its said first and second position not affecting the high pressure contact between said conducting finger and the bus bar; biasing means urging said first control toward said third position when said finger is fully projected and urging said first control toward said first position when said finger is within the confines of the case, cooperating engageable means carried by said first control and said cover to prevent opening of said cover when said first control is in said first and said third positions and permitting opening of said cover when said first control is in said second position, said cooperating engageable means constructed so that during closing of said cover said first control is automatically moved to said second position against the force of said biasing means.

4. A plug-in unit for a bus duct system comprising a case, a first means, a second means, a first control operatively connected to said first means, a second control operatively connected to said second means, said case having a cover and an opening, said opening being positioned to be in alignment with a duct housing opening when said case is fastened to the duct housing, said first means comprising a conducting finger, said first control having three positions, said conducting finger being within the confines of said case when said first control is in said first and second positions and being projected out of said case opening into high pressure engagement with a bus bar when said first control is in said third position, said second position of said first control being between said first and third position; said first control being operatively connected to said first means through a direct mechanical drive to thereby give positive control of said conducting finger, said second means comprising a pair of cooperating contacts and an operating mechanism, said operating mechanism being associated with said cooperating contacts to bring them into and out of engagement, said cooperating contacts being disengaged when said second control is in a first position and engaged when said second control is in a second position, movement of said second control between its said first and second position not affecting the high pressure contact between said conducting finger and the bus bar, a first interlock operatively associated with said first and second controls, said first interlock preventing said second control from being moved to its said second position unless said first control is in its said third position; biasing means urging said first control toward said third position when said finger is fully projected and urging said first control toward said first position when said finger is within the confines of the case, cooperating engageable means carried by said first control and said cover to prevent opening of said cover when said first control is in said first and said third positions and permitting opening of said cover when said first control is in said second position, said cooperating engageable means constructed so that during closing of said cover said first control is automatically moved to said second position against the force of said biasing means.

5. A plug-in unit for a bus duct system comprising a case, a first means, a second means, a first control operatively connected to said first means, a second control operatively connected to said second means, a member projecting from said case being positioned to engage an opening in a duct housing shutter thereby automatically opening the shutter when said plug-in unit is mounted on a duct housing and automatically closing the shutter when said plug-in unit is removed from a duct housing, said case having a cover and an opening, said opening being positioned to be in alignment with a duct housing opening when said case is mounted on the duct housing, said first means comprising a conducting finger, said first control having three positions, said conducting finger being within the confines of said housing when said first control is in said first and second positions and being projected out of said plug opening to engage bus bar in high pressure when said first control is in said third position, said second position of said first control being between said first and third position; said first control being operatively connected to said first means through a direct mechanical drive to thereby give positive control of said conducting finger; biasing means urging said first control toward said third portion when said finger is fully projected and urging said first control toward said first position when said finger is within the confines of the case, cooperating engageable means carried by said first control and said cover to prevent opening of said cover when said first control is in said first and said third positions and permitting opening of said cover when said first control is in said second position, said cooperating engageable means constructed so that during closing of said cover said first control is automatically moved to said second position against the force of said biasing means.

6. A plug-in unit for a bus duct system comprising a case, a first means, a second means, a first control operatively connected to said first means, a second control operatively connected to said second means, said case having a cover and an opening, said opening being positioned to be in alignment with a duct housing opening when said plug is secured to the duct housing, said first means comprising a conducting finger, said first control being rotatably mounted on said case, said first control having three positions, said conducting finger being within the confines of said case when said first control is in said first and second positions and being projected out of said case opening to engage a bus bar with high pressure when said first control is in said third position, said second position of said first control being between said first and third position; said first control being operatively connected to said first means through a direct mechanical drive to thereby give positive control of said conducting finger, said second means comprising a pair of cooperating contacts and an operating mechanism, said operating mechanism being associated with said cooperating contacts to bring them into and out of engagement, said cooperating contacts being disengaged when said second control is in a first position and engaged when said second control is in a second position, movement of said second control between its said first and second position not affecting the high pressure contact between said conducting finger and said bus bar, a first interlock operatively associated with said first and second controls, said first interlock preventing said second control from being moved to its said second position unless said first control is in its said third position, a second interlock operatively associated with said first and second controls, said second interlock preventing said first control from being moved out of its said third position unless said second control is in its said first position; biasing means urging said first control toward said third position when said finger is fully projected and urging said first control toward said first position when said finger is within the confines of the case, cooperating engageable means carried by said first control and said cover to prevent opening of said cover when said first control is in said first and said third positions and permitting opening of said cover when said first control is in said second position, said cooperating engageable means constructed so that during closing of said cover said first control is automatically moved to said second position against the force of said biasing means.

7. The plug-in unit of claim 1 in which the cooperating engageable means comprises a projection extending from said cover and a slot means formed in said first control; said slot means having a first portion wherein said projection is disposed when said cover is closed and said first control is operated between said first and said third positions; said slot means having a second portion through which said projection passes when said cover is being opened and closed; said second portion positioned to receive said projection only when said first control is in said second position.

References Cited in the file of this patent

UNITED STATES PATENTS

| | | |
|---|---|---|
| 2,381,848 | Van Valkenburg | Aug. 7, 1945 |
| 2,645,688 | De Smidt et al. | July 14, 1953 |
| 2,786,908 | Constantine et al. | Mar. 26, 1957 |
| 2,902,555 | Herrmann | Sept. 1, 1959 |